Figure 1:
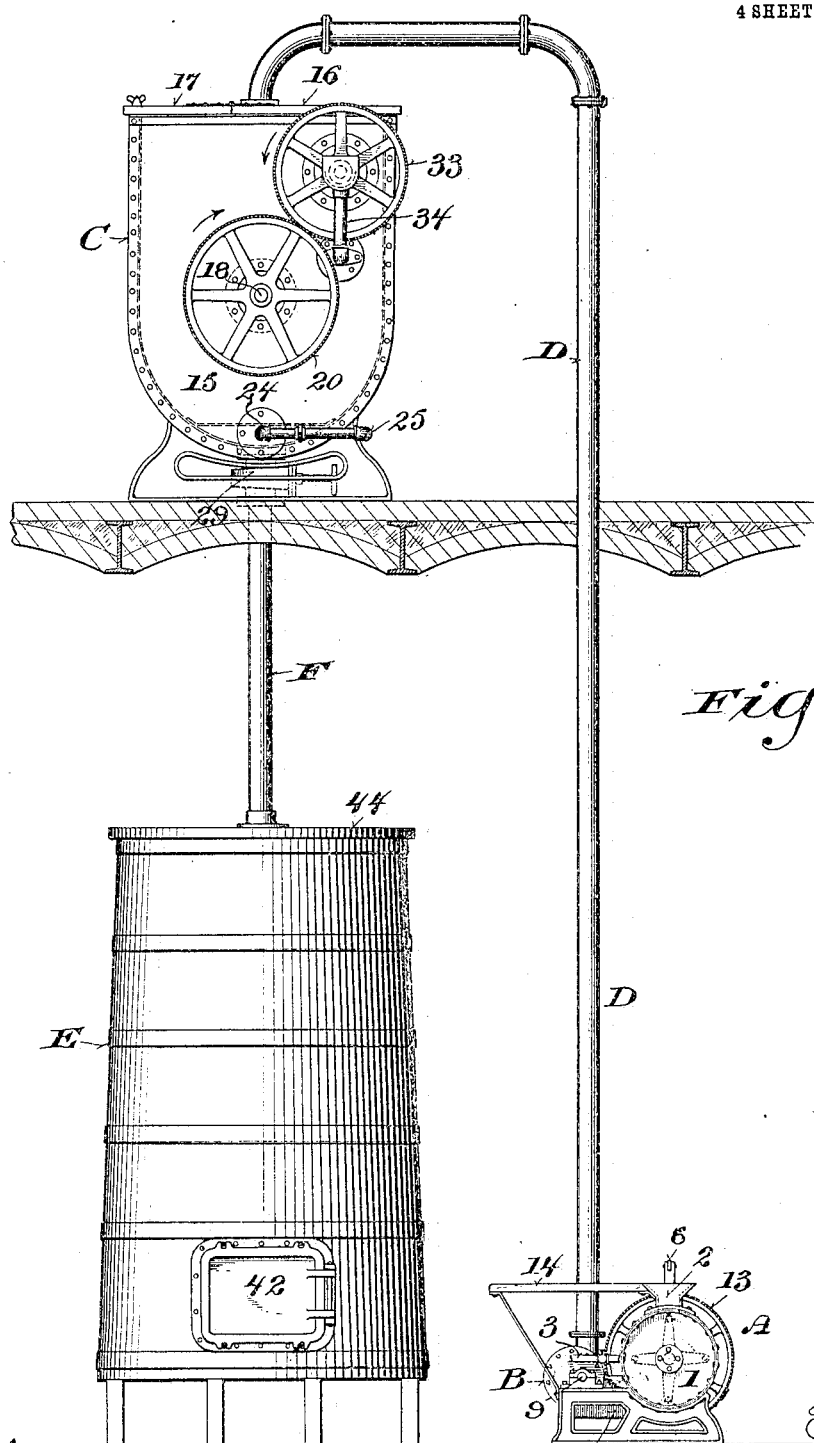

No. 787,971. PATENTED APR. 25, 1905.
R. BIRKHOLZ.
APPARATUS FOR TREATING FILTER PULP.
APPLICATION FILED JUNE 1, 1900.

4 SHEETS—SHEET 1.

Witnesses
Geo. W. Young
Chas. L. Goss

Inventor:
Richard Birkholz
By Whitcher Fowler Smith Rothwell
Attorneys

No. 787,971. PATENTED APR. 25, 1905.
R. BIRKHOLZ.
APPARATUS FOR TREATING FILTER PULP.
APPLICATION FILED JUNE 1, 1900.
4 SHEETS—SHEET 2.
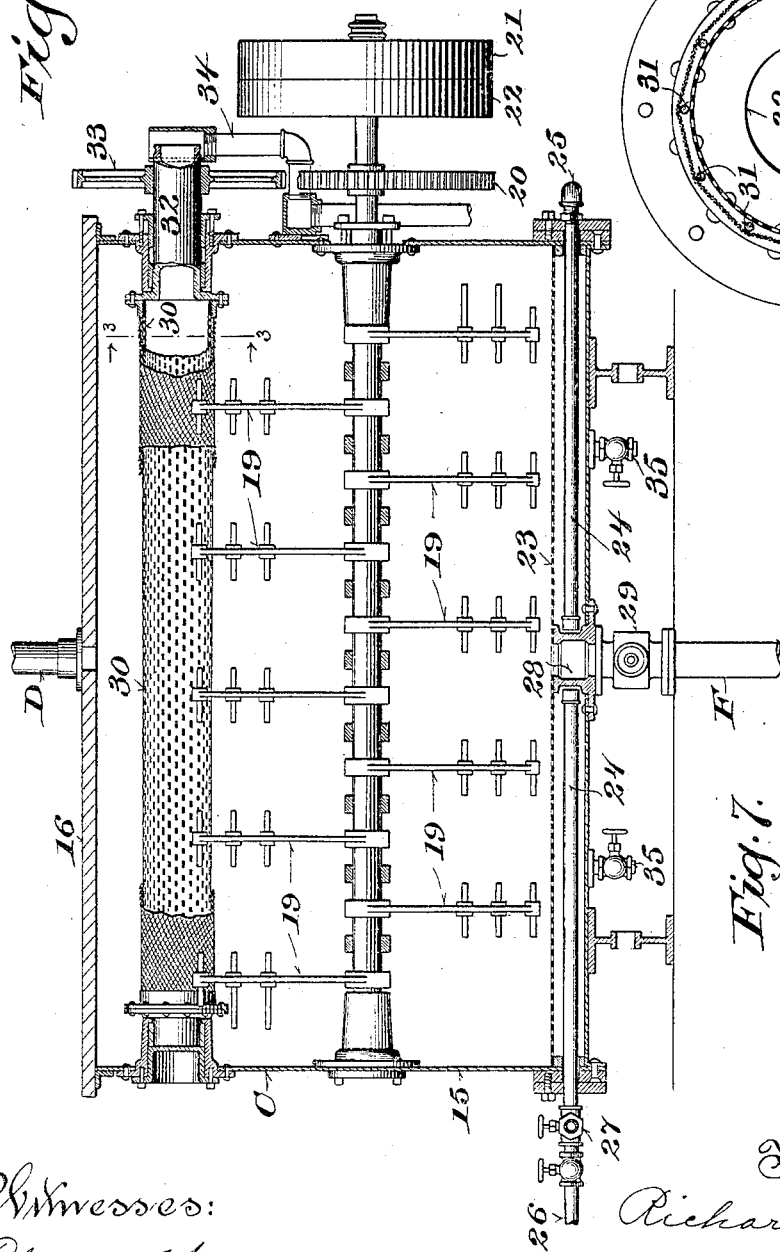
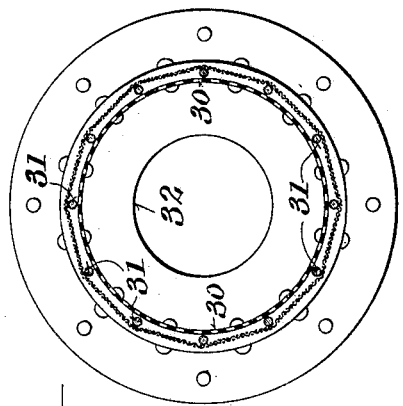
Witnesses:
Geo. W. Young.
Chas. L. Goss.
Inventor:
Richard Birkholz
By his Attorneys

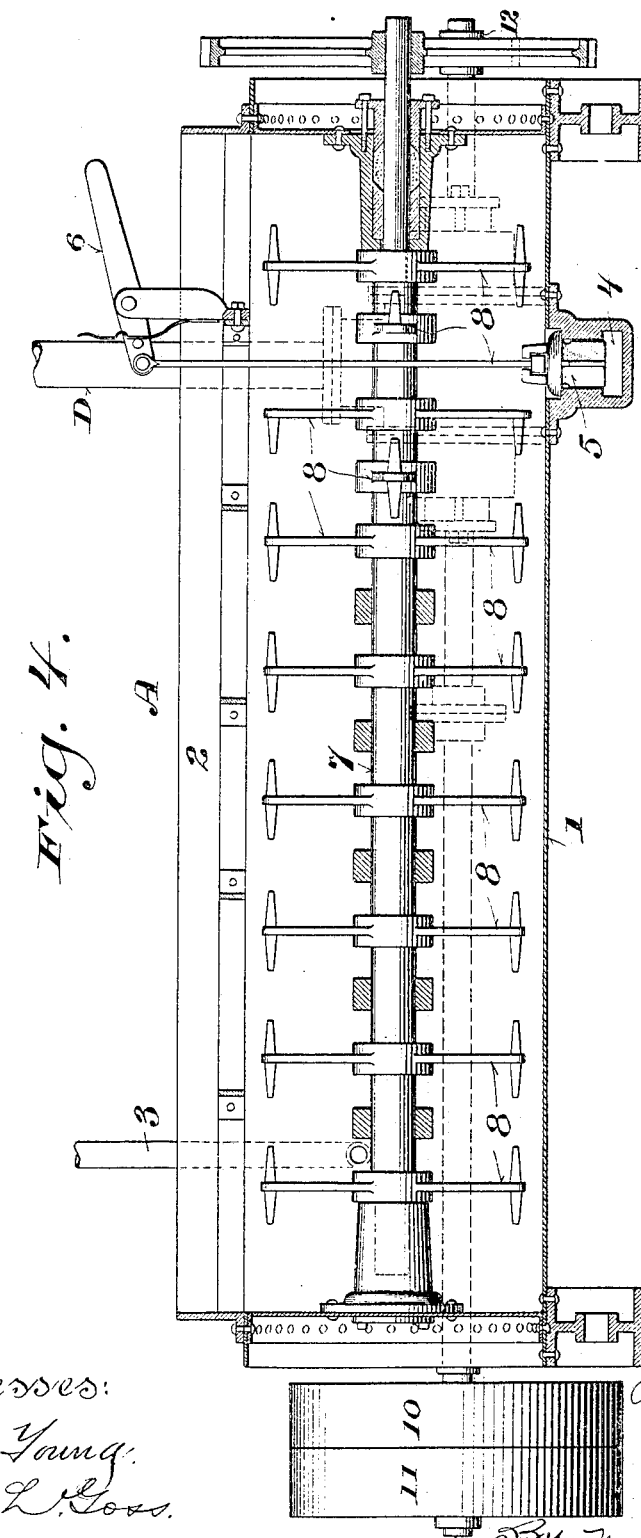

No. 787,971. PATENTED APR. 25, 1905.
R. BIRKHOLZ.
APPARATUS FOR TREATING FILTER PULP.
APPLICATION FILED JUNE 1, 1900.
4 SHEETS—SHEET 4.
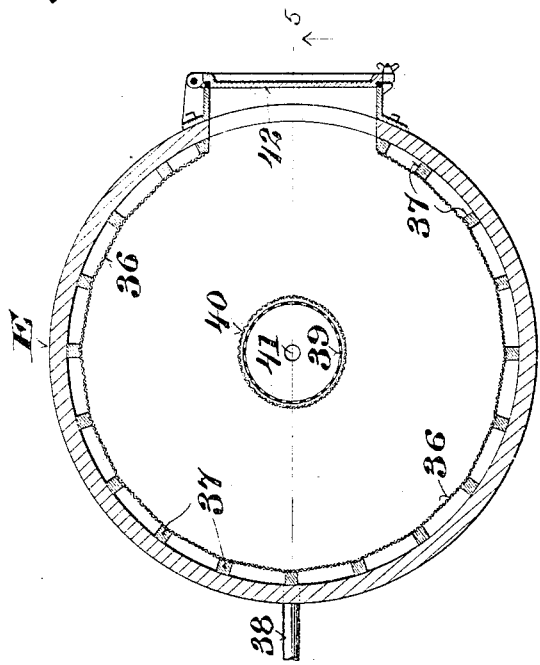
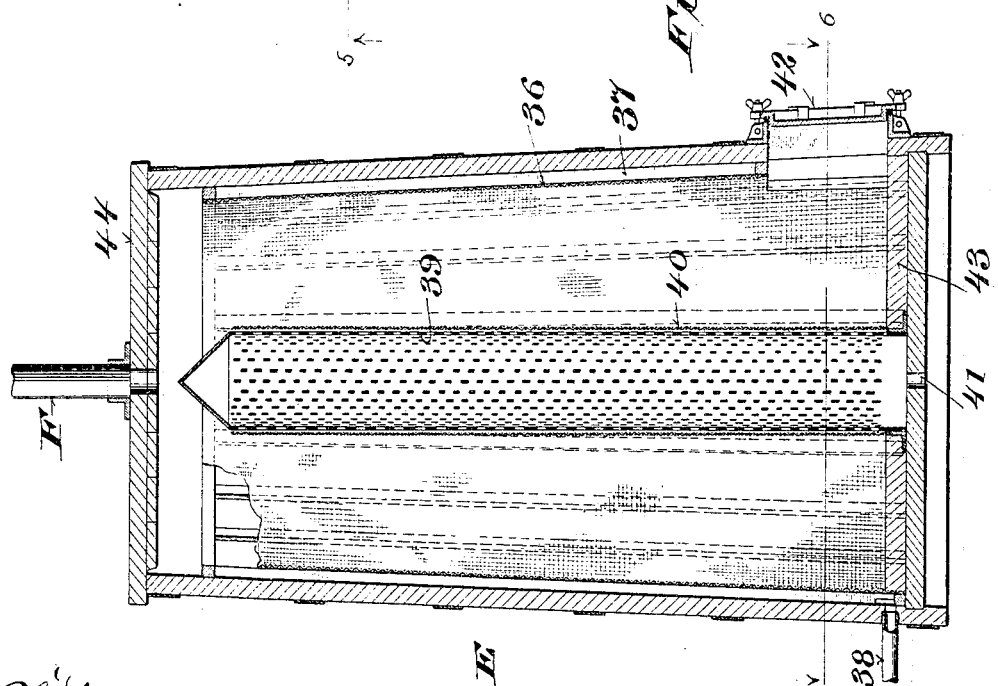
Witnesses:
Geo. W. Young.
Chas. L. Goss.
Inventor:
Richard Birkholz,
By his Attorneys.

No. 787,971. Patented April 25, 1905.

UNITED STATES PATENT OFFICE.

RICHARD BIRKHOLZ, OF MILWAUKEE, WISCONSIN, ASSIGNOR TO E. GOLDMAN & CO., OF CHICAGO, ILLINOIS, A COPARTNERSHIP.

APPARATUS FOR TREATING FILTER-PULP.

SPECIFICATION forming part of Letters Patent No. 787,971, dated April 25, 1905.

Application filed June 1, 1900. Serial No. 18,720.

*To all whom it may concern:*

Be it known that I, RICHARD BIRKHOLZ, a citizen of the United States, residing at Milwaukee, in the county of Milwaukee and State of Wisconsin, have invented certain new and useful Improvements in Apparatus for Treating Filter-Pulp, of which the following is a specification, reference being had to the accompanying drawings, forming a part thereof.

My invention relates particularly to the removal of impurities from the pulp employed in breweries for filtering beer.

The main object is in cleaning and restoring such pulp to save time and labor, to avoid waste of water, to prevent contamination of the purified pulp by handling and exposure to impure air, to avoid raising the temperature of the room or cellar in which the filters are located, and generally to improve the construction and operation of apparatus of the class to which my invention pertains.

It consists in certain novel features in the construction and arrangement of component parts of the apparatus, as hereinafter particularly described, and pointed out in the claims.

In the accompanying drawings, like characters designate the same parts in the several figures.

Figure 1 is an elevation of apparatus embodying my invention. Fig. 2 is a vertical longitudinal section, on an enlarged scale, of the washer constituting a part of the apparatus. Fig. 3 is a cross-section, on a still larger scale, on the line 3 3, Fig. 2, of the rotary overflow-screen. Fig. 4 is a vertical longitudinal section of the mixer. Fig. 5 is a vertical section on the line 5 5, Fig. 6. Fig. 6 is a horizontal section on the line 6 6, Fig. 5, of the strainer-tank; and Fig. 7 is an enlarged cross-section of one of the perforated pipes in the washer.

When the pulp becomes clogged with impurities, it must be removed from the filters, disintegrated, and cleansed before it can be used again for filtering beer. This has been done by mixing and washing the pulp with cold water in machines placed in the cold filter-cellars near the filters, the semisolid cakes into which the pulp is compressed being broken up for this purpose and water caused to flow through the mass while it is being agitated and disintegrated in the washing-machine. While the pulp can be washed and improved in color by this process, it cannot be sterilized, but will still contain bacteria or germs which will contaminate the beer.

By a later and better method of treatment the pulp has been boiled to destroy the injurious germs; but this cannot be done in the cold filter-cellar because the heat required for the operation would produce too high a temperature for the filters, so that the washing-machine has to be placed in another room, preferably in a higher story. According to this later and improved process the pulp is carried by hand in boxes from the filter-cellar up to the room containing the washing-machine. It is first washed with cold water till the water runs clear from the machine. The pulp is next raised to a boiling temperature by the introduction of steam into the washing-machine. It is then cooled down with a copious supply of cold water displacing the hot water which overflows from the machine. When it is sufficiently cooled, it is dumped from the washing-machine into a strainer-box placed below it, and when the water has drained off sufficiently to leave the pulp of the desired consistency it is transferred into other boxes in which it is carried by hand back into the filter-cellar, where it is to be used. This process not only involves the loss of time and labor in carrying the pulp back and forth by hand, but also waste of water, the exposure of the sterilized pulp to the contaminating effect of contact with impure air and with the open carrying-boxes which are more or less infected with germs, and the admission of warm outside air into the filter-cellar by the frequently-repeated opening of doors and the consequent loss in refrigeration.

With my improved apparatus the pulp is thoroughly washed, sterilized, and cooled, and the above-noted difficulties and objections are avoided.

Referring to Fig. 1, which is a general view of the complete apparatus, A is the mixer for disintegrating the pulp, mixing it with water, and reducing it to a fluid mass, and B is a pump usually associated therewith for elevating or transferring the pulp to the washer. The mixer is placed in the cold filter-cellar near or easily accessible from the filters, the pulp of which is to be restored by the apparatus herein described. C is the washer located in another room, preferably above the filter-cellar, as shown, so that the heat given off by the washer in boiling and sterilizing the pulp will not affect the temperature of the filter-cellar, which must be kept at a low temperature for the process of filtering beer. The washer is connected at the top by a pipe D with the discharge branch of the pump B. E is a strainer-tank into which the washed and sterilized pulp is discharged from the washer for draining off the surplus water and reducing the pulp to the proper consistency for the filters. It is connected at the top by a pipe F with the bottom of the washer and is located in the cold filter-cellar near or within easy reach of the filters in which the pulp after it has been treated is to be reused.

By means of the arrangement above described the time and labor required to carry the pulp by hand to the washer and back again to the filters are saved, the pulp is transferred from the filter-cellar to the washing-machine and returned to the filter-cellar after it has been washed and sterilized without coming in contact with impure air or with exposed surfaces from which might be imparted to it germs or other impurities that would contaminate the beer, waste of water is avoided, and the repeated opening of the cold filter-cellar for carrying the pulp out and in and the consequent ingress of warm air and loss in refrigeration are rendered unnecessary.

Referring to Fig. 4, showing the mixer in detail on an enlarged scale, 1 is a horizontally-disposed cylinder or pulp-receptacle, which may be conveniently made of boiler-plate or other suitable sheet metal. It is formed with a longitudinal opening in the top and provided over said opening with a hopper 2 for introducing the pulp cake, which is previously broken up, into the mixer. It is provided with a valve-controlled water-supply connection 3 and in the bottom with an outlet connection 4, which is normally closed by a valve 5. This valve is connected by a rod with a lever 6, mounted in some convenient position on the mixer, for opening and closing said valve. The mixer is provided with a rotary stirrer, which consists of a shaft 7 and radially-disposed arms 8, mounted thereon. The shaft 7 is supported axially in the cylinder by suitable bearings on the cylinder-heads, one of said bearings being formed with a stuffing-box, through which said shaft projects. The outlet connection 4 constitutes or leads into the suction branch of a rotary or cam pump B, which may be mounted upon the same frame with the cylinder A and constitutes a part of the mixer, as shown in Fig. 1. 9 is a driving-shaft mounted on one side of the mixer-frame parallel with the stirrer-shaft 7. It is provided with tight and loose pulleys 10 and 11 and is attached directly to the rotary pump-piston. The shaft of the pump-piston projects through a stuffing-box in the opposite end of the pump-casing and is provided with a gear 12, which meshes with a gear 13 on the adjacent end of the stirrer-shaft 7. To the discharge branch of the pump is attached the pipe D, which leads into the washer, as hereinbefore stated. To facilitate introducing the broken pulp cake into the washer, a platform 14 is provided, preferably above the driving-shaft and pump on a level with the top of the hopper 2.

Referring to Figs. 2 and 3, showing the internal construction of the washer on an enlarged scale, 15 is a horizontally-disposed casing or receptacle, which is preferably made of cylindrical form on the under side and, may, like the mixer-receptacle, be conveniently constructed of boiler-plate or other suitable sheet metal. It is provided with a cover 16, which has a hinged section 17, as shown in Fig. 1, for affording easy access to the interior of the washer without disturbing the connection of pipe D, which is attached to the permanent or stationary part of said cover. The washer, like the mixer, is provided with a rotary stirrer, consisting of a shaft 18, supported lengthwise and centrally in said casing or receptacle by bearings in the ends of the casing, and of arms 19, mounted upon said shaft. These arms are formed or provided with cross pieces or projections for thoroughly agitating and mixing the pulp. The shaft 18 projects at one end through its adjacent bearing, which is provided with a stuffing-box, and upon its protruding end is mounted a gear 20 and tight and loose pulleys 21 and 22. The casing or receptacle 16 is provided below the stirrer with a screen or perforated strainer-plate 23, and in the space between said strainer-plate and the bottom of the casing perforated pipes 24 are arranged lengthwise of the washer and connected on the outside with each other by a pipe 25 and with valve-controlled steam and cold-water supply pipes 26 and 27. The outlet connection 28, to which the pipe F is attached, opens both through the bottom of the casing 15 and the perforated strainer-plate 23, and the pipes 24 terminate at their inner ends on opposite sides of said connection.

The pipe F is provided just below the washer with a valve 29 for controlling the discharge of the pulp from the washer into the strainer-tank below. The washer is provided with a rotary overflow-screen consisting of a perforated hollow metal cylinder 30, which is provided on the outside, as shown in Fig. 3, with longitudinal ribs 31 and of wire-cloth wrapped around said cylinder over said ribs, which give it a polygonal form and hold it away from the cylinder, thereby preventing the clogging of the screen with pulp. This screen is supported by bearings in the ends of the casing parallel with and above and to one side of the stirrer-shaft 18. One of its trunnions, 32, is made hollow and projects through a stuffing-box in the adjacent bearing. A gear 33, mounted on this trunnion outside of the casing, meshes with the gear 20 on the stirrer-shaft and turns said screen downward on its side toward the stirrer, which is turned in an opposite direction. By this arrangement of the screen and its actuating connections it is made to descend on the side against which the pulp is impelled by the stirrer-arms and to ascend on the opposite side through which there is an outward current of water produced by the stirrer. The pulp which is thus deposited and held by the current upon the descending side of the screen is washed off on the ascending side by the outflowing current and the screen is thereby kept clear. At its outer end the hollow trunnion 32 empties into the upper end of a waste-pipe 34, which is permanently attached to the machine. Waste-cocks 35 are attached to the bottom of the casing 15, one on each side of the pipe F, for draining water from the washer, as hereinafter explained.

Referring to Figs. 5 and 6, showing on an enlarged scale the internal construction of the strainer-tank, 36 is a wire-cloth screen attached to vertical slats 37 on the inner side of the tank and supported by said slats at a distance from the inner wall of the tank, so as to form a water-space or descending water-ways which communicate with each other and with an outlet 38 at the bottom of the tank. 39 is a hollow column arranged centrally within the tank and preferably made of perforated sheet metal. It is closed at the top with a conical cap, the apex of which is directly below the opening at the lower end of the pipe F through the cover of the tank, so as to spread the pulp discharged from said pipe into the tank and deposit it evenly in the annular space between said column and the screen 36. The column is surrounded by a wire-cloth screen 40 of sufficiently fine mesh to prevent the pulp from passing through the perforations in the column and woven with coarse vertical wires or bearing bends at intervals to produce a space between it and the perforated sheet-metal column and prevent clogging. The space within the column communicates with an outlet-opening 41 through the bottom of the tank. An opening provided with a door or closure 42 for the removal of the drained pulp is made through the lower part of the tank and screen, and the space between the tank and screen around this opening is closed. As a heavy wooden tank is utilized for this purpose, in order to allow for the frame of the door 42 above the hoop around the bottom of the tank and to bring the bottom of the tank to the level of the bottom of the door-opening an extra layer of plank 43 is provided between the screen 36 and the column 40. This extra layer of plank serves incidentally to hold the lower edge of the screen 36 and the base of the column 40 in place. The tank is provided with a cover 44, which affords means of attachment for the pipe F and protects the pulp against exposure to the outside air and contamination with impurities contained therein.

The apparatus operates as follows: When the pulp to be treated is taken from the filters, it is in the form of hard cakes. These are broken up and placed in the washer, which is supplied with a sufficient quantity of water through the pipe 3 to form with the pulp a fluid mass. The valve 5 is closed and the stirrer turned until the pulp is thoroughly disintegrated and mixed with the water. The valve 5 is then opened, and the pump forces the pulp up through the pipe D into the washer C. The discharge-valve 29 being closed, cold water is admitted from the pipe 27 to the perforated pipes 24 in the bottom of the washer. The stirrer and the overflow-screen being turned in opposite directions, as hereinbefore explained, the pulp is thoroughly washed until the water overflowing from the machine runs clear. The stirrer-arms 19 separate and agitate the pulp as the water flows through it and produce a current in the upper part of the washer toward and against the descending side of the overflow-screen. The water passing through the screen is conducted off through the hollow trunnion 32 into the waste-pipe 34. On the ascending side of the screen the outflowing current produced by the stirrer removes the pulp adhering to the outside of the wire-cloth, leaving its meshes clear as it descends on the other side into the pulp. Clogging of the overflow is thus prevented, and great trouble and annoyance are avoided by this simple expedient. When the cold overflow-water runs clear, the supply from the pipe 27 is cut off, and steam is admitted from the pipe 26 through the perforated pipes 24 until the mass boils and all the bacteria or germs which may be contained therein are destroyed. The steam is then shut off, and the waste-valves 35 in the bottom of the washer are opened, allowing the hot water to drain from the pulp. When this has been done, the waste-valves 35 are closed, and cold water is again admitted to the machine to cool the pulp and carry off any impurities which may have been set free by the preceding boiling process. By draining off the hot water and conducting the process as above explained much less cold water is required to wash and cool the pulp than is required by the methods heretofore employed. As soon as the pulp is cooled sufficiently to prevent its affecting the temperature of the filter-cellar the cold water is again shut off, the valve 29 is opened, and the fluid mass is discharged into the strainer-tank E below. The pulp being thus deposited in the annular space between the vertically-disposed screens 36 and 40, the surplus water is rapidly drained therefrom, and as soon as it is reduced to the desired consistency it is removed from said tank in condition for further use in the filters.

It will be observed that the pulp in its circuit through the apparatus, as above explained, does not come in contact with impure outside air; that it is fed to the apparatus and delivered therefrom in the filter-cellar within easy reach of the filters in a condition that will not affect the temperature of the filter-cellar; that no handling is necessary except to break up the pulp cakes, place them in the washer, and remove the washed and sterilized pulp from the strainer-tank and place it again in the filters; that the pulp is not only thoroughly washed, but is also subjected to a sterilizing temperature outside of the filter-celler in such a way as to avoid loss of refrigeration and waste of water.

Various changes in the details of construction and arrangement of parts may be made within the spirit and intended scope of my invention.

I claim—

1. In apparatus for treating filter-pulp the combination of a mixer, a washer located in a separate room above the mixer and provided with a stirrer and with water and steam supply connections and an overflow, and a pump having a suction connection with the lower part of the mixer and a discharge connection with the washer, substantially as and for the purposes set forth.

2. In apparatus for treating filter-pulp the combination of a mixer located in the filter-cellar, a washer located in a room above the filter-cellar, a pump having connections with the mixer and washer and adapted to elevate the pulp from the mixer into the washer, and a strainer-tank located in the filter-cellar and connected by a pipe with the lower part of the washer, substantially as and for the purposes set forth.

3. In apparatus for treating filter-pulp the combination of a mixer, a washer connected with the lower part of the mixer and a strainer-tank connected with the lower part of the washer, substantially as and for the purposes set forth.

4. In apparatus for treating filter-pulp the combination of a mixer consisting of a receptacle provided with a stirrer, a washer consisting of a receptacle connected by a pipe with the lower part of the mixer-receptacle and provided with a stirrer and with water and steam supply connections and an overflow, and a strainer consisting of a receptacle connected by a pipe with the lower part of the washer and provided with a vertically-disposed screen and with a drain-opening in the lower part of the water-space, substantially as and for the purposes set forth.

5. In apparatus for treating filter-pulp the combination of a horizontally-disposed trough or cylinder having an opening in the top to receive the pulp, and a rotary stirrer consisting of a shaft supported lengthwise in said trough by bearings in the ends thereof and provided with arms, and a pump having a valve-controlled suction connection with the bottom of said trough and geared with one end of the stirrer-shaft, substantially as and for the purposes set forth.

6. In apparatus for treating filter-pulp the combination of a receptacle provided with a water-supply connection, a horizontally-disposed rotary stirrer and a rotary overflow-screen having an outlet-opening through one end and arranged above and parallel with said stirrer to that side thereof toward which it turns, and means for turning said stirrer and overflow-screen in opposite directions, substantially as and for the purposes set forth.

7. In apparatus for treating filter-pulp the combination with a horizontally-disposed pulp-receptacle having a water-supply connection, a rotary stirrer supported horizontally by bearings in the ends of said receptacle, and a rotary overflow-screen arranged parallel with the stirrer and composed of a perforated cylinder having an outlet-opening through one end and longitudinal ribs on the outside and of wire-cloth wrapped around said cylinder over the ribs thereon, substantially as and for the purposes set forth.

8. In apparatus for treating filter-pulp the combination of a tank provided on the inside with vertical slats and a screen attached to the inner sides of said slats which form descending waterways outside of said screen, said waterways communicating at their lower ends with an outlet-opening in the lower part of the tank, and a separate opening for the removal of the pulp being formed through the lower part of the tank and screen and closed to said waterways, substantially as and for the purposes set forth.

9. In apparatus for treating filter-pulp the combination of a tank provided at or near the bottom with an opening for removing the pulp therefrom and with a closure for said opening, and a screen attached to vertically-disposed slats forming descending waterways which communicate with an outlet-opening in the lower part of the tank and are closed to the opening for the removal of the pulp, substantially as and for the purposes set forth.

10. In apparatus for treating filter-pulp, a strainer-tank having a central perforated column the interior of which communicates with an outlet-opening at the bottom, and a screen surrounding the interior of the tank at a distance from its inner wall and forming therewith a water-space which communicates at the bottom with an outlet-opening through the tank which has a discharge-opening for the pulp communicating with the lower part of the space between said column and screen and provided with a closure, substantially as and for the purposes set forth.

11. In apparatus for treating filter-pulp, a strainer-tank provided with a vertically-disposed screen surrounding the interior of the tank at a distance from its inner wall and forming a water way or space which communicates at the bottom with an outlet-opening, and a hollow perforated column surrounded by a screen and communicating inside at the bottom with an outlet-opening, said tank having a door opening through the lower part thereof into the space between said screens, substantially as and for the purposes set forth.

12. In apparatus for treating filter-pulp the combination of a tank having a discharge-opening provided with a closure at or near the bottom, a hollow perforated column having a conical top and communicating at the bottom with an outlet-opening through the tank, and an inlet connection opening into said tank over the apex of said column, substantially as and for the purposes set forth.

13. In apparatus for treating filter-pulp the combination of a tank having a closed cover, a central hollow perforated column, a screen surrounding said column near the inner wall of the tank, a discharge-door opening through the tank into the space between said column and screen, waste-openings through the tank into the lower part of the water ways or spaces outside of said screen and inside of said column, and an inlet connection opening into the top of said tank over said column, substantially as and for the purposes set forth.

In witness whereof I hereto affix my signature in presence of two witnesses.

RICHARD BIRKHOLZ.

Witnesses:
 CHAS. L. GOSS,
 CHARLES F. FAWSETT.